United States Patent [19]

Brashears et al.

[11] Patent Number: 5,164,158
[45] Date of Patent: Nov. 17, 1992

[54] METHODS FOR REMEDIATING CONTAMINATED SOILS

[75] Inventors: David F. Brashears, Belle Isle; Qaiser A. Azeez, Winter Park, both of Fla.

[73] Assignee: Thermotech Systems Corporation, Orlando, Fla.

[21] Appl. No.: 627,243

[22] Filed: Dec. 14, 1990

[51] Int. Cl.$^5$ .................................................. A61L 2/06
[52] U.S. Cl. ............................................ 422/1; 110/226; 110/236; 110/246; 47/1.42
[58] Field of Search ............... 422/1, 26, 38; 110/236, 110/246, 226; 47/1.42

[56] References Cited

U.S. PATENT DOCUMENTS

| | | | |
|---|---|---|---|
| Re. 29,502 | 12/1977 | Jaronko et al. | 110/14 |
| 3,794,565 | 2/1974 | Beilski et al. | 202/100 |
| 3,906,874 | 9/1975 | Jaronko et al. | 110/14 |
| 3,938,450 | 2/1976 | Jaronko et al. | 110/8 |
| 4,046,085 | 9/1977 | Barry et al. | 110/12 |
| 4,518,350 | 5/1985 | Mueller et al. | 432/13 |
| 4,542,703 | 9/1985 | Przewalski | 110/246 |
| 4,554,876 | 11/1985 | Grachtrup | 110/246 |
| 4,575,336 | 3/1986 | Mudd et al. | 432/72 |
| 4,576,572 | 3/1986 | Mueller et al. | 432/13 |
| 4,648,332 | 3/1987 | Goodhart | 110/346 |
| 4,648,333 | 3/1987 | Mudd et al. | 110/346 |
| 4,667,609 | 5/1987 | Hardison et al. | 110/236 |
| 4,700,638 | 10/1987 | Przewalski | 110/346 |
| 4,708,641 | 11/1987 | Meininger | 432/72 |
| 4,748,921 | 6/1988 | Mendenhall | 110/346 |
| 4,750,436 | 6/1988 | Maury et al. | 110/346 |
| 4,782,625 | 11/1988 | Gerken et al. | 47/1.42 |
| 4,784,603 | 11/1988 | Robak, Jr. et al. | 432/5 |
| 4,801,384 | 1/1989 | Steiner | 210/634 |
| 4,815,398 | 3/1989 | Keating, II et al. | 110/233 |
| 4,864,942 | 9/1989 | Fochtman et al. | 110/226 |
| 4,869,825 | 9/1989 | Steiner | 210/634 |
| 4,881,473 | 11/1989 | Skinner | 110/244 |
| 4,881,475 | 11/1989 | De Leur | 110/346 |
| 4,889,484 | 12/1989 | Przewalski | 432/103 |
| 4,922,841 | 5/1990 | Kent | 110/246 |
| 4,951,417 | 8/1990 | Gerkin et al. | 110/226 |
| 4,957,429 | 9/1990 | Mendenhall | 110/236 |
| 4,958,578 | 12/1990 | Houser | 110/246 |
| 4,961,391 | 10/1990 | Mak et al. | 110/246 |
| 4,974,528 | 12/1990 | Barcell | 110/236 |

Primary Examiner—Robert J. Warden
Assistant Examiner—Laura E. Collins
Attorney, Agent, or Firm—Nixon & Vanderhye

[57] ABSTRACT

A soil remediation unit includes a counterflow drum for burning off volatile hydrocarbons and delivery to a cooler drum. Particulate-laden gases of combustion flow through a separator wherein the particle stream is delivered to the cooler drum and the gas stream delivered to a heat exchanger. The gas stream flows to a thermal oxidizer, the exhaust gas from which lies in heat exchange relation with the gas from the separator. Portions of the exhaust gas are passed into the separator in counterflow relation to the particles for remediating the particles.

11 Claims, 3 Drawing Sheets

METHODS FOR REMEDIATING CONTAMINATED SOILS

BACKGROUND AND SUMMARY OF THE INVENTION

The present invention relates to apparatus and methods for treating contaminated soils, particularly those containing hydrocarbon products and hydrocarbon chemicals, such as PCBs, and particularly relates to apparatus and methods for remediating hydrocarbon-contaminated soils in a thermally efficient, environmentally compatible and safe manner.

Soils are frequently contaminated with hydrocarbon products and this constitutes a highly significant and major pollution problem. The contaminants may range from gasoline through heavy hydrocarbon products and hydrocarbon chemicals, such as PCBs. Various efforts have been directed to remediating the soil and one of the most effective is to thermally treat the soil. However, high cost is an inhibiting factor and, in many cases, is the result of inefficiently designed equipment and limited equipment capacities. For example, a major factor affecting the cost is fuel efficiency, as well as the downstream treatment of the residual gaseous components driven off from the soil. Thermal efficiency is disregarded in many systems. For example, water spray quench systems are frequently used for treating exhaust gas streams, often without regard to heat recovery. Heat recovery in high temperature fume incineration is also frequently ignored. Consequently, the cost for clean-up of contaminated soil ranges typically from $30 a ton to well over $300 per ton, depending on the level of contamination, type of contaminant, type of soil in which the contaminant exists, and overall quantity of the contaminant.

In these prior systems, the basic process for cleaning the soil is to expose it to high temperatures whereby the contaminant is volatilized and subsequently oxidized or processed in a reducing environment to leave a carbon char material in the soil. The temperatures at which the soils must be processed can vary substantially from as low as 300° F. discharge temperature on the soil to over 1,000° F. in order to obtain satisfactory low levels of total residual petroleum hydrocarbons. With these wide-ranging temperatures necessary to clean up a wide variety of contaminants, it is essential to design a remediation system which, not only effectively removes the contaminants, but does so in a thermally and, hence, fuel efficient manner.

In accordance with the present invention, a thermally and fuel efficient system for cleaning a wide variety of soils contaminated with different hydrocarbon products is provided. The system includes a counterflow dryer roaster wherein contaminated soil is supplied the elevated end of an inclined drum for flow toward the opposite end, and at which end a burner is mounted. The exhaust gases from the burner and the residual contaminated dust and gases driven from the soil are delivered through an outlet at the upstream inclined end of the dryer to a dust collector, preferably a cyclone. The counterflow drum dryer has internal flights to provide heavy veiling of the soil and rapid convective heat transfer from the hot gas stream to the soil. The drum also has a high-temperature refractory zone downstream from the soil inlet and adjacent the burner for achieving very high temperatures. Consequently, the soil can be processed at wide-ranging temperatures, enabling remediation of soils contaminated with different types of hydrocarbons.

The soil is discharged from the dryer roaster into a rotary cooler for cooling the remediated soil prior to discharge. The cooler has a water inlet which creates steam in the cooler. The dust from the separator is passed through primary and secondary baghouses, where hydrocarbons thereon are volatilized by heat transfer from gases discharged from a thermal oxidizer. The clean dust is then passed into the rotary cooler for thorough mixing with the soil discharged from the dryer roaster. The steam from the rotary cooler is blended with hot gases from a stack and the thermal oxidizer discharge for heat recovery purposes and to elevate the temperature of the gases in the secondary baghouse above the dewpoint. The clean soil is, of course, discharged from the rotary cooler.

The exhaust gases after dust separation in the primary baghouse are supplied to a heat exchanger which also receives the high-temperature exhaust from the thermal oxidizer. In the thermal oxidizer, the exhaust gases are heated to a set point temperature, e.g., 1200° F. to 1600° F., to fully destroy residual hydrocarbons in the gas stream. The discharge from the thermal oxidizer passes through the heat exchanger and into a stack for release. A portion of the discharged gas, however, is diverted for passage through the primary baghouse and into the dust collector to heat the dust collected in these units sufficiently to volatilize any residual hydrocarbon, leaving the dust clean. Additionally, the discharge from the thermal oxidizer or from the stack is blended with the steam from the rotary cooler in the secondary baghouse to raise the temperature of the gases in the secondary baghouse above the dewpoint temperature, e.g., 200° F. to 250° F. Thus, any dust from the treated soil in the rotary cooler is heated in the secondary baghouse by heat recovered from the thermal oxidizer and its temperature is therefore elevated sufficiently to keep these materials above the dewpoint temperature so that the baghouse can operate properly. Consequently, by the counterflow design of the dryer roaster and the high temperature gases from the thermal oxidizer, the very high temperatures necessary to the volatilization of a large range of commonly anticipated contaminants can be achieved on the soil, with relatively low temperatures in the exhaust gas train from the dryer and stack, whereby minimization of costs of the units is achieved. Also, by coupling the discharge from the thermal oxidizer in heat exchange relation with the gases going to the thermal oxidizer, significant amounts of energy from the thermal oxidizer is recovered.

Also unique to the present system is a dust oven disposed adjacent the bottom of the baghouses and the collector for volatilizing residual hydrocarbons on the dust. Dust collected by the separator is conveyed into the primary baghouse by a screw conveyor. The screw conveyor is internal to the dust oven. The outside tubular housing of the screw is perforated so that the collected dust will be discharged along its length inside the dust oven. The dust is picked up by the gases flowing through the oven, exiting at the bottom and in the process are elevated to a high temperature to volatilize any remaining hydrocarbons. In this oven, dust collected by those units is conveyed into the secondary baghouse and into the cooler by a screw conveyor. Around the conveyor from the dust collector, there is provided a hot gas oven comprised of an elongated tube designed to effect efficient heat transfer with the dust falling to the bottom of the hoppers toward the screw conveyor in the primary baghouse. The heat transfer is provided by discharging exhaust gases (1200° F. to 1600° F.) from the thermal oxidizer into the tube wherein heat energy is transferred by conduction through the conveyor housing to the dust as the dust flows downwardly over and about it. These hot gases also exhaust the oven tube in a downward direction for flow upwardly countercurrently to the downward flow of dust from the primary baghouse into the screw conveyor and for additional heat transfer to the dust from the primary baghouse. Any residual hydrocarbons on the dust are thus volatilized and carried with the gases through the primary baghouse to the thermal oxidizer. The bottom panels of the dust oven are hinged, so that the clearance between the side walls and these panels can be adjusted down the length of the baghouse to provide for adjustment of the heat transfer from the gases to the downwardly flowing dust.

In a preferred embodiment according to the present invention, there is provided a method for remediating contaminated soils comprising the steps of heating the soil in a rotating drum to volatilize the contaminant, flowing particulate-laden gases from the drum through a first particle separator for separation into a first exhaust gas stream and a first particle stream, passing the heated soil and first particle stream into a cooler, cooling and combining the heated soil and particles of the first particle stream in the cooler and discharging the combined remediated soil and particles from the cooler through a discharge, elevating the temperature of the first exhaust gas stream in a heat exchanger and passing the first exhaust gas stream at elevated temperature through a thermal oxidizer to fully destroy any residual contaminants therein, leaving a substantially clean exhaust gas stream, passing the clean exhaust gas stream from the thermal oxidizer through the heat exchanger in heat exchange relation with the first exhaust gas stream from the particle separator and for exhaust therefrom to atmosphere, combining a portion of the clean exhaust gas stream from the thermal oxidizer with residual particle-laden gases from the cooler to form a second particle-laden exhaust gas stream, flowing the second particle-laden exhaust gas stream through a second particle separator for separation into a second exhaust gas stream and a second particle stream and delivering the second particle stream to the discharge and exhausting the second exhaust gas stream to atmosphere.

In a further preferred embodiment according to the present invention, there is provided a method for remediating contaminated soils comprising the steps of heating the soil in a rotating drum to volatilize the contaminant, flowing particulate-laden gases from the drum through a particle separator for separation into an exhaust gas stream and a particle stream, passing the heated soil and particle stream into a cooler, cooling the heated soil and particles of the particle gas stream in the cooler and discharging the combined remediated soil and particles from the cooler through a discharge, elevating the temperature of the exhaust gas stream in a heat exchanger and passing the exhaust gas stream at the elevated temperature through a thermal oxidizer to fully destroy any residual contaminants therein, leaving a substantially clean exhaust gas stream, passing the clean exhaust gas stream from the thermal oxidizer through the heat exchanger in heat exchange relation with the exhaust gas stream from the particle separator and for exhaust therefrom to atmosphere, diverting a portion of the clean exhaust gas stream from the thermal oxidizer into the particle separator in heat exchange relation with the particle stream therefrom whereby the particle stream is heated and passed into said cooler and combining the clean exhaust gas stream portion and the exhaust gas stream from the particle separator prior to placing the latter in heat exchange relation in the heat exchanger.

In a further preferred embodiment according to the present invention, there is provided a method for remediating contaminated soils comprising the steps of heating the soil in a rotating drum to volatilize the contaminant, flowing particulate-laden gases from the drum through a particle separator for separation into an exhaust gas stream and a particle stream, passing the heated soil and particle stream into a cooler, cooling the heated soil and particles of the particle gas stream in the cooler and discharging the combined remediated soil and particles from the cooler through a discharge, passing the exhaust gas stream through a thermal oxidizer to fully destroy any residual contaminants therein, leaving a substantially clean exhaust gas stream, passing at least a portion of the clean exhaust gas stream from the thermal oxidizer into the particle separator in heat exchange relation with the particle stream therefrom whereby the particle stream is heated and passed into the cooler and combining the clean exhaust gas stream portion and the exhaust gas stream from the particle separator.

In a still further preferred embodiment according to the present invention, there is provided a particle separator and heat exchanger comprising means defining a chamber having an inlet for receiving particulate-laden gases and an outlet for particles separated from the particulate-laden gases, a separator in the chamber for separating the particles and gases one from the other and for directing the flow of the separated particles in a predetermined direction for flow to the outlet, means for introducing hot gases into the separator and means for flowing the hot gases in heat exchange relation with the flow of the particles whereby the particles are heated prior to their discharge from the separator.

Accordingly, it is a primary object of the present invention to provide novel and improved apparatus and methods for remediating contaminated soils in an environmentally safe manner having improved thermal and fuel efficiency whereby capital and operating costs are reduced and substantial portions of the heat in the system are recovered for use in the system.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
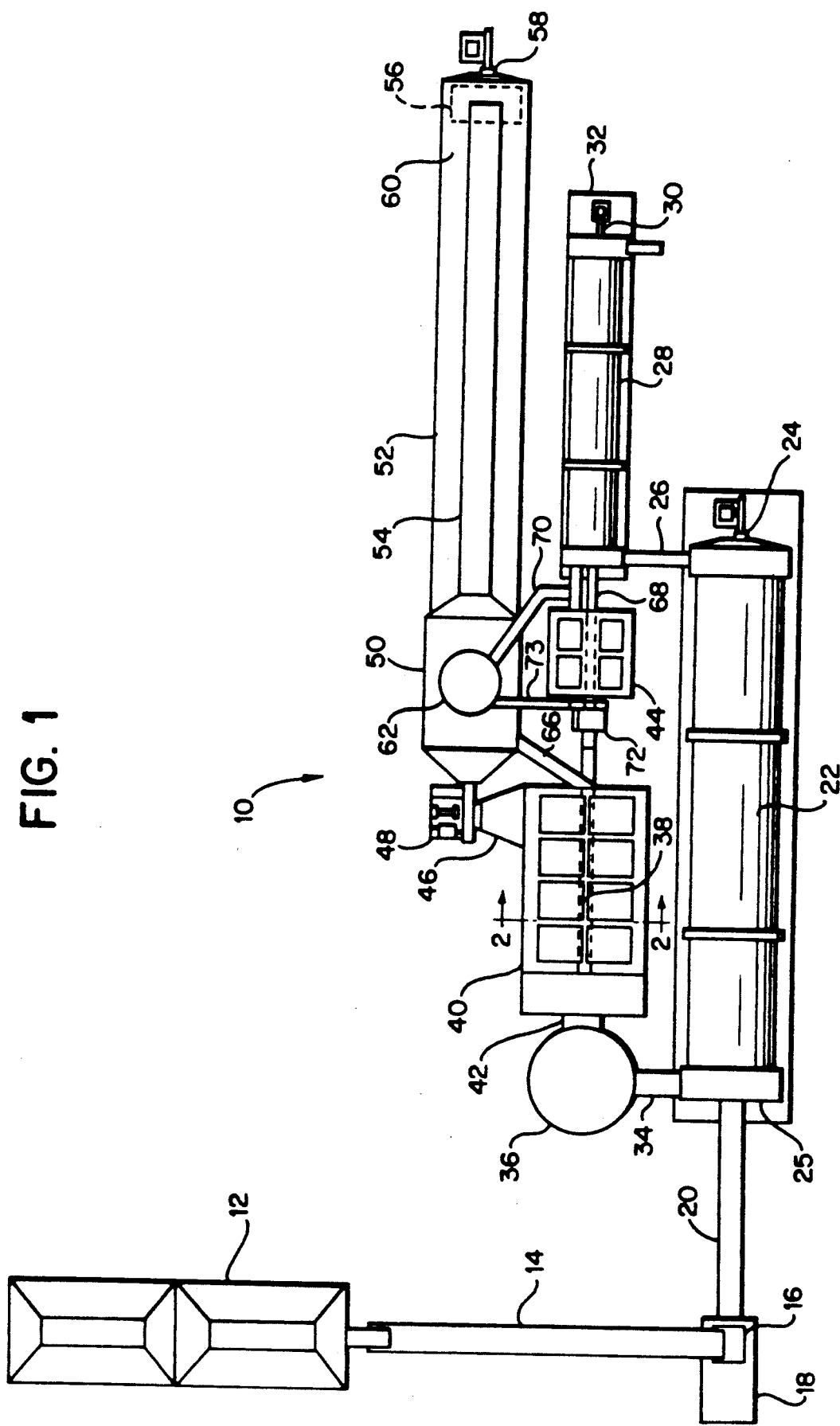
FIG. 1 is a schematic plan view of a soil remediation system constructed in accordance with the present invention.
Figure 3:
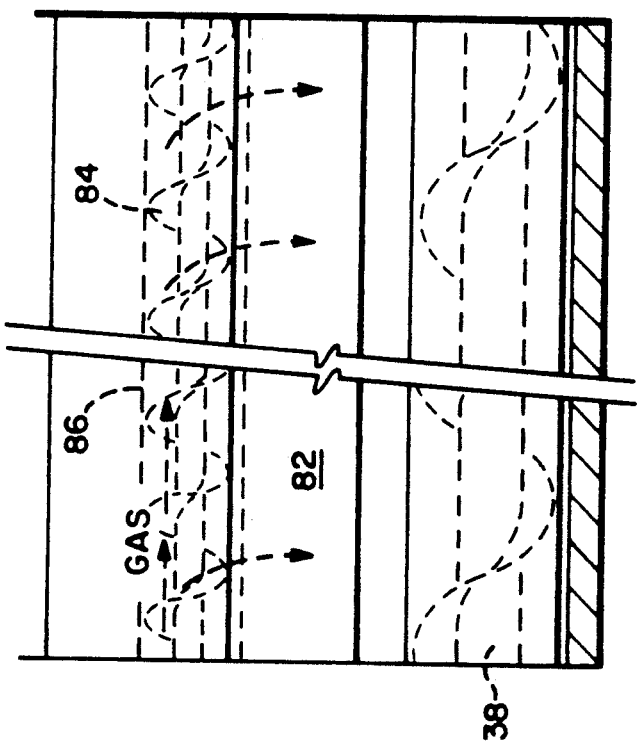
FIG. 3 is an enlarged vertical cross-sectional view through the hopper portion illustrated in FIG. 2.

Referring now to the soil remediation system illustrated in FIG. 1, generally designated 10, the various components will be described, followed by a description of their interrelation with one another in connection with the operation of the system. In FIG. 1, there is provided a plurality of feed bins 12 for receiving the contaminated soil. The contaminated soil in bins 12 is conveyed by an elevating belt conveyor 14 to a shredder 16 which, in turn, conveys the material to a vibrating screen 18. Shredder 16 is used to break up the larger lumps of the soil and the vibrating screen is used to removed over-sized materials, such as chunks of concrete, roots and the like, so that only soil of a particular particle size will enter system 10. A conveyor 20 then conveys the contaminated soil into a dryer roaster 22.

Dryer roaster 22 comprises an inclined drum having a burner 24 at its lower end for generating hot gases for flow countercurrently to the direction of flow of soil through the drum, the drum being rotatable about its longitudinal axis by means not shown. Flighting, not shown, is provided along the interior of the drum for approximately the first two-thirds of the distance of the drum. The flighting provides a heavy veiling effect which cascades the contaminated soil through the hot gas stream and effects rapid convective heat transfer from the hot gas stream to the soil. The veiling also enables the gas to flow countercurrently to the direction of flow of the soil in the drum. At a location approximately two-thirds of the length of the drum from its elevated soil inlet end 25, the flighting ends and a refractory section is provided. Consequently, the soil in the refractory section is subjected to very high temperatures immediately prior to being discharged through a soil discharge chute 26 at the lower downstream end of the drum. By using a counterflow drum, the exhaust gas temperature at the upper elevated end is relatively low, on the order of 300° to 375° F. whereby the size of subsequent units treating the dust entrapped in the exhaust gas is minimized.

The heated soil from the discharge chute 26 is disposed in a rotary cooler 28. Cooler 28 comprises a drum mounted for rotation about its long axis and is similarly inclined as dryer roaster drum 22 such that the hot remediated soil from discharge 26 is disposed in the elevated end of cooler 28. A water spray nozzle 30 is disposed in the lower end of cooler 28 and extends part-way into the drum for remoistening and cooling the soil. A suitable pump 32 is provided for pumping water through the nozzles 30. As explained hereinafter, the water spray in the cooler in part turns into steam, which is directed preferably out through the inlet end of cooler 28 for use elsewhere in the system. The steam, however, could be directed out the opposite end.

Figure 2:
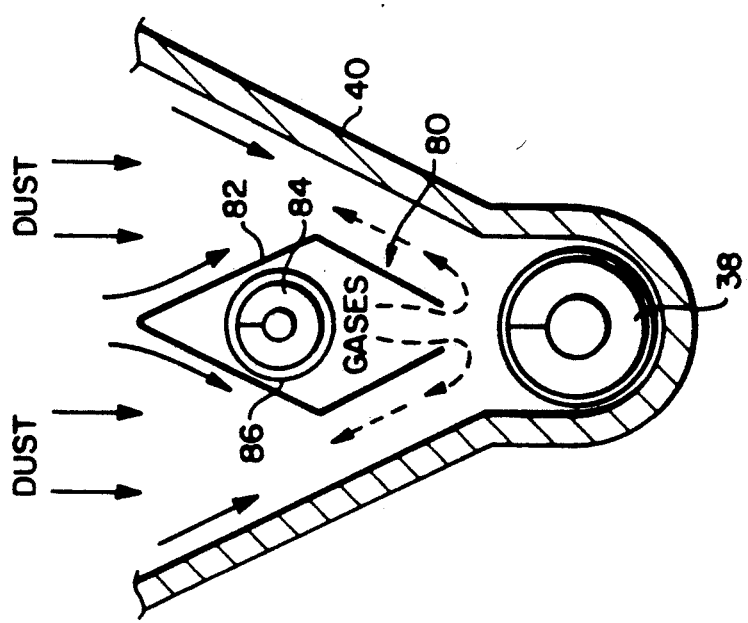
FIG. 2 is an enlarged cross-sectional view taken about on line 2—2 in FIG. 1 illustrating a hot gas header, constructed in accordance with the present invention, in the hopper portion of the primary baghouse.
Figure 4:
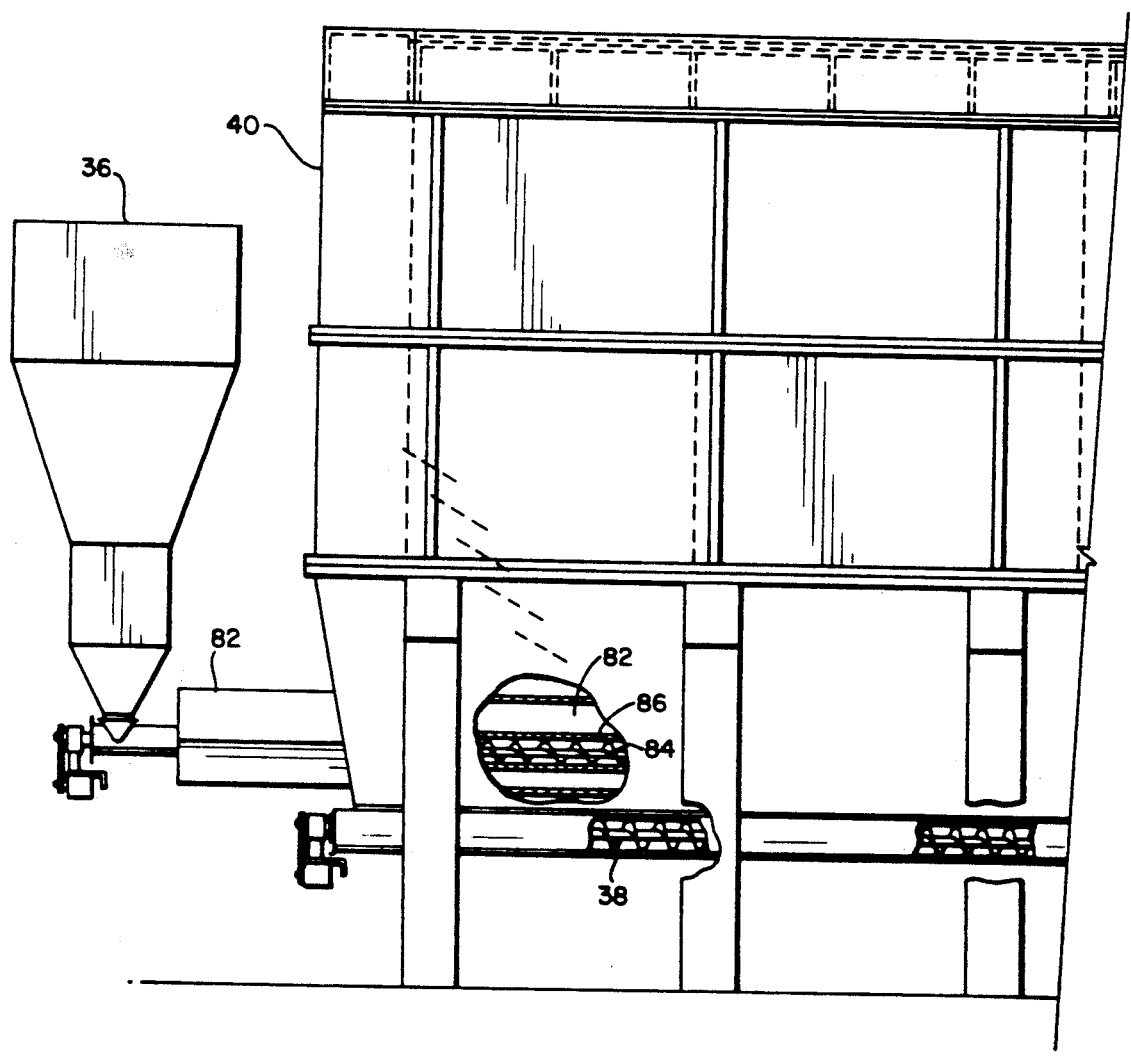
FIG. 4 is an enlarged fragmentary elevational view with parts broken out and in cross-section of the primary baghouse illustrating a portion of the dust oven.

It will be appreciated that when the soil is introduced into the dryer roaster drum 22 and flows therealong, particulate dust is carried into the burner exhaust gas stream through a burner exhaust duct 34 at the upper elevated end of the drum 22. Because the particulate dust may contain contaminants and must therefore be treated prior to release to the atmosphere, the burner exhaust gas with entrained particulate dust flows into a primary collector which may be a centrifugal cyclone 36. The cyclone 36 separates relatively large particles from the dust stream and enables such particles to fall to the bottom of a conical section of the cyclone. A screw conveyor 84 (FIG. 2) is located in the bottom of cyclone 36 for conveying the large particles into a primary baghouse 40. The remaining exhaust gases and particulate dust exit the primary collector 36 through a duct 42 for entry into the baghouse 40. As discussed in detail hereinafter, the screw conveyor from collector 36 extends through the dust oven 80 located in the bottom of the primary baghouse 40. In the primary baghouse 40, the exhaust gases are cleansed of the dust and the dust flows downwardly toward the bottom of the baghouse for treatment in the dust oven area of the baghouse described hereinafter. The cleansed exhaust gases exit the primary baghouse 40 via an exhaust duct 46 and are drawn therefrom by a fan 48. The exhaust fan directs these gases into a heat exchanger 50, where the temperature of the gases is substantially elevated by heat transfer with gases discharged from a thermal oxidizer 52. Particularly, the exhaust gases are directed from heat exchanger 50 into a duct 54 to the thermal oxidizer. These gases enter a manifold 56 and lie in surrounding relation to a thermal oxidizer burner head 58. The gases reverse their direction of flow and flow through a combustion zone 60 for discharge into heat exchanger 50. In the thermal oxidizer, the exhaust gases are heated from their relatively low entering temperature to a set point temperature necessary to destroy any residual hydrocarbons in the gas stream. The discharged gases from the thermal oxidizer thus lie in heat exchange relation in heat exchanger 50 with the exhaust gas from the primary baghouse 40 and from which heat exchanger the exhaust gases from the thermal oxidizer are transmitted to a stack 62.

A portion of the hot exhaust gases from thermal oxidizer 52 is transmitted via duct 66 into the primary baghouse. As explained hereinafter, these hot gases are used in the dust oven in the baghouse to heat the dust captured in those units.

It will be recalled with respect to soil cooler 28, that water is introduced through spray nozzles 30 and creates steam within cooler 28. The steam flows, e.g., countercurrently to the remediated soil entering through the cooler 28, and exits through a duct 68 for blending with hot gases supplied via duct 70 from either the stack 62 or the discharge from the thermal oxidizer 52. In this manner, the temperature of the gases in secondary baghouse 44 are raised above the dewpoint temperature. These gases are then cleaned of any dust picked up in cooler 28 and are withdrawn from the secondary baghouse by an exhaust fan 72 via duct 73 for return to the atmosphere through stack 62.

Screw conveyor 38, which extends along the bottom of the primary baghouse 40 and secondary baghouse 44 conveys the collected dust into cooler 28 for mixing with the remediated soil. However, prior to mixing with the clean soil, the dust is subjected to an elevated temperature sufficient to volatilize any hydrocarbons which have been condensed on these dust particles. To accomplish this, and referring particularly to FIG. 2, there is provided a dust oven, generally designated 80, preferably comprising a hot gas header 82, which extends longitudinally from the primary collector through the primary baghouse, although it will be appreciated that the header may extend only in the primary baghouse. Header 82 is located in the bottom sections of the hoppers of the primary baghouse and in a hopper at the bottom of the collector. Header 82 has a cross-section designed to provide a large area for contact with dust particles settling into the bottom of the baghouse and collector. For example, a substantial diamond-shaped cross-section for the header may be provided. Also, the lower walls of the diamond-shaped header are pivoted along their upper edges to adjust the clearance between the lower edges thereof and the side walls of the hopper thereby to adjust the flow of hot gas in heat transfer relation with the downwardly flowing dust. The header is provided with hot discharge gases from the thermal oxidizer via conduit 66. Within the header 82 is a screw conveyor 84 disposed in a tubular housing 86 for conveying dust from the separator 36 into the primary baghouse 40. Housing 86 is perforated to permit dust to settle out along its length into the dust oven through housing 86 for volatilizing any residual hydrocarbons by heat exchange with the hot discharge gases from the thermal oxidizer.

Because the baghouse has a lower-than-atmospheric pressure, the hot gases from the thermal oxidizer are drawn into header 82 in the baghouse. Consequently, header 82 affords conductive heat transfer to the dust settling in the primary baghouse. Additionally, the lower end of the hot gas header 82 is provided with one or more apertures for enabling egress of the hot discharge gas from the thermal oxidizer into the lower portion of the header and directly above screw conveyor 38. As a consequence, the hot gas exhaust from the header exiting toward the screw conveyor flows countercurrently in an upward direction relative to the dust flowing downwardly in the baghouse toward the screw. The settling particulate dust is thus quickly heated conductively by contact with oven 82 and convectively by the countercurrent flow of the hot gases exiting header 82. In this manner, the dust adjacent the bottom of the primary baghouse may be elevated in temperature sufficiently to volatilize hydrocarbons condensed on the particulate dust particles. The volatiles are carried by the gases as they rise in the primary baghouse and collector for egress through the baghouse to the thermal oxidizer. It will be appreciated that other forms of hot gas header may be utilized.

Alternatively, the sides of the hopper in the primary baghouse and in the collector may be jacketed to receive the hot gases. Apertures may be provided at the lower end of the jacketed side walls. This jacketed arrangement may likewise be used in conjunction with hot gas header 82 whereby hot gas would exit both the header and the lower ends of the jackets for counterflow with the settling particulate dust.

It will be appreciated that various control devices are applied to the foregoing-described system for maximum efficiency dependent upon the soils, extent of contamination, type of contamination and the like. For example, the temperature of the soil being discharged from the dryer roaster, as well as the dust from the primary baghouse and primary cyclone collector are controlled. Thus, by controlling the firing rate of the burner system on the dryer, the discharge temperature of the soil can be regulated. A dust oven scavenger flue damper may be used to control the temperature of the dust exiting the primary baghouse and collector by allowing greater or lesser amounts of hot gases to leave the thermal oxidizer and enter the baghouse dust oven. The firing rate of the thermal oxidizer burner also may be used to regulate the exhaust gas temperature from the thermal oxidizer in accordance with the constituents of the exhaust gas stream entering the thermal oxidizer. The temperature of the soil discharged from the cooler can be controlled by regulating the water flow rate into the cooler. The temperature of the exhaust gases exiting the secondary baghouse would be controlled by modulation of the gases being recirculated from the stack through the damper.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for remediating contaminated soils comprising the steps of:

heating contaminated the soil in a rotating drum to volatilize contaminants;

flowing particulate-laden gases from the drum through a first particle separator for separation into a first exhaust, gas stream and a first particle stream;

passing the heated soil and first particle stream into a cooler;

cooling and combining the heated soil and particles of the first particle stream in said cooler and discharging the soil and particles from the cooler through a discharge;

elevating the temperature of the first exhaust gas stream in a heat exchanger and passing the first exhaust gas stream at elevated temperature through a thermal oxidizer to fully destroy any residual contaminants therein, leaving a clean exhaust gas stream;

passing the clean exhaust gas stream from said thermal oxidizer through said heat exchanger in heat exchange relation with the first exhaust gas stream from said particle separator and for exhaust therefrom to atmosphere;

combining a portion of the clean exhaust gas stream from said thermal oxidizer with residual particle-laden gases from said cooler to form a second particle-laden exhaust gas stream;

flowing said second particle-laden exhaust gas stream through a second particle separator for separation into a second exhaust gas stream and a second particle stream; and delivering the second particle stream to said discharge and exhausting said second exhaust gas stream to atmosphere.

2. A method according to claim 1 wherein said first particle separator includes a cyclone and a filter, and including the further steps of flowing the particulate-laden gases from the drum sequentially through said cyclone and said filter to separate the particulate-laden gases into said first exhaust gas stream and said first particle stream.

3. A method according to claim 1 including mixing the heated soil and particles from the first and second particle streams with water in the cooler.

4. A method according to claim 1 including the steps of diverting a second portion of the clean exhaust stream from said thermal oxidizer into said first particle separator in heat exchange relation with the first particle stream therein whereby the first particle stream is heated and passed into said cooler;

combining said second portion of the clean exhaust gas stream and the first exhaust gas stream from the particle separator prior to placing the latter in heat exchange relation in said heat exchanger.

5. A method according to claim 4 including mixing the heated soil and particles from the first and second particle streams with water in the cooler.

6. A method for remediating contaminated soils comprising the steps of:

heating contaminated soil in a rotating drum to volatilize contaminants;

flowing particulate-laden gases from said drum through a particle separator for separation into an exhaust gas stream and a particle stream;

passing the heated soil and particle stream into a cooler;

cooling the heated soil and particles of the particle gas stream in said cooler and discharging the soil and particles from the cooler through a discharge;

elevating the temperature of the exhaust gas stream in a heat exchanger and passing the exhaust gas stream at the elevated temperature through a thermal oxidizer to fully destroy any residual contaminants therein, leaving a clean exhaust gas stream;

passing the clean exhaust gas stream from said thermal oxidizer through said heat exchanger in heat exchange relation with the exhaust gas stream from said particle separator and for exhaust therefrom to atmosphere;

diverting a portion of the clean exhaust gas stream from said thermal oxidizer into said particle separator in heat exchange relation with the particle stream therefrom whereby the particle stream is heated and passed into said cooler; and combining said clean exhaust gas stream portion and the exhaust gas stream from the particle separator prior to placing the latter in heat exchange relation in said heat exchanger.

7. A method according to claim 6 including flowing the diverted portion of the clean exhaust gas stream from said thermal oxidizer into a header in said particle separator, said particle separator comprising a filter medium disposed above said head enabling separated particles to flow downwardly about said header and disposing said clean exhaust gas stream portion in heat exchange relation with the downwardly flowing particles.

8. A method according to claim 6 including flowing the diverted portion of the clean exhaust gas stream in counterflow relation to the flow of particles in the particle stream of the separator.

9. A method for remediating contaminated soils comprising the steps of:

heating contaminated soil in a rotating drum to volatilize contaminants;

flowing particulate-laden gases from said drum through a particle separator for separation into an exhaust gas stream and a particle stream;

passing the heated soil and particle stream into a cooler;

cooling the heated soil and particles of the particle gas stream in said cooler and discharging the soil and particles from the cooler through a discharge;

passing the exhaust gas stream through a thermal oxidizer to fully destroy any residual contaminants therein, leaving a clean exhaust gas stream;

passing at least a portion of the clean exhaust gas stream from said thermal oxidizer into said particle separator in heat exchange relation with the particle stream therefrom whereby the particle stream is heated and passed into said cooler; and combining said clean exhaust gas stream portion and the exhaust gas stream from the particle separator.

10. A method according to claim 9 including flowing the portion of the clean exhaust gas stream from said thermal oxidizer into a header in said particle separator, said particle separator comprising a filter medium disposed above said head enabling separated particles to flow downwardly about said header and disposing said clean exhaust gas stream portion in heat exchange relation with the downwardly flowing particles.

11. A method according to claim 9 including flowing the portion of the clean exhaust gas stream in counterflow relation to the flow of particles in the particle stream of the separator.

* * * * *